US006465603B2

(12) United States Patent
Schmid

(10) Patent No.: US 6,465,603 B2
(45) Date of Patent: Oct. 15, 2002

(54) ELECTRICALLY CONDUCTIVE INORGANIC POLYMER

(76) Inventor: Walter Schmid, Panoramaweg 24, D-88416 Erlenmoos (DE)

( * ) Notice: Subject to any disclaimer, the term of this patent is extended or adjusted under 35 U.S.C. 154(b) by 19 days.

(21) Appl. No.: 09/730,753

(22) Filed: Dec. 7, 2000

(65) Prior Publication Data

US 2001/0003773 A1 Jun. 14, 2001

(30) Foreign Application Priority Data

Dec. 7, 1999 (EP) ........................................... 99124407

(51) Int. Cl.[7] ................................................ C08G 79/14
(52) U.S. Cl. ........................ 528/370; 528/395; 252/500
(58) Field of Search ................................ 528/370, 395; 252/500

(56) References Cited

U.S. PATENT DOCUMENTS 2,844,551 A * 7/1958 Orthner et al. ............... 260/18
3,483,142 A * 12/1969 Saraceno ....................... 260/2
4,533,712 A * 8/1985 Taniguchi et al. ............. 528/9
4,698,417 A * 10/1987 Morgan ...................... 528/395
5,614,596 A * 3/1997 Laine et al. ................ 525/389
5,777,058 A * 7/1998 Fischer .......................... 528/9

* cited by examiner

*Primary Examiner*—Margaret G. Moore
(74) *Attorney, Agent, or Firm*—Bacon & Thomas

(57) ABSTRACT

Provided is an electrically conductive inorganic polymer containing at least one alkali metal or alkaline earth metal and at least one of the metals selected from the $IV^{th}$ to $XI^{th}$ subgroup and $III^{rd}$ to $V^{th}$ main group starting with atom number 31. This polymer is obtained in that in a $1^{st}$ stage, at least one alkali carbonate or alkaline earth carbonate is fused under heating with at least one metal oxide on the basis of the metals selected from the $IV^{th}$ to $XI^{th}$ subgroup and the $III^{rd}$ to $V^{th}$ main group starting with atom number 31, and the resulting melt is allowed to cool down, in a $2^{nd}$ stage, the material obtained in the $1^{st}$ stage is fused under heating with a further metal oxide on the basis of the metals selected from the $IV^{th}$ to $XI^{th}$ subgroup and the $III_{rd}$ to $V^{th}$ main group starting with atom number 31, the intermediate polymer obtained in the $2^{nd}$ stage is reduced in a $3^{rd}$ stage. The polymer according to the present invention disposes not only of a high electroconductivity but possesses also good mechanical properties and can easily be further processed, for example in the form of a galvanic coating on a substrate.

20 Claims, No Drawings

ELECTRICALLY CONDUCTIVE INORGANIC POLYMER

DESCRIPTION

The invention relates to an electrically conductive inorganic polymer containing at least one metal a) selected from the group consisting of copper, an alkali metal and an alkaline earth metal, and at least one metal b) selected from the group consisting of a metal of the $1^{st}$, $2^{nd}$, $4^{th}$, $5^{th}$, $6^{th}$, $7^{th}$ and $8^{th}$ subgroup and the $3^{rd}$, $4^{th}$ and $5^{th}$ main group of the periodic system starting with atom number 31, an intermediate polymer and a method for producing said inorganic polymer.

Various types of metal alloys and even intermetallic compounds are already known. These, however, are frequently difficult to process further or to produce.

Thus, from JP 62084091, an electrically conductive inorganic polymer is known containing a metal of the $5^{th}$ group. For the production of this polymer, a metal dithiolate complex is thermally decomposed.

The object of the present invention is to provide for an electrically conductive inorganic polymer disposing not only of a high electroconductivity, but also of good mechanical properties and which may easily be further processed.

This object is solved by an electrically conductive inorganic polymer according to the teaching of the claims.

The electrically conductive inorganic polymer according to the present invention, just called polymer in the following, is obtainable by a method comprising three main stages. Is the metal concerned according to the invention copper a), a preliminary stage has then to be carried out, wherein copper carbonate is mixed to form a slurry with an oxide of at least one metal b) with the addition of water. The water is evaporated therefrom by heating. The thereby obtained material may, for example, be pulverized.

The term "copper carbonate" thereby comprises pure copper carbonate, hydrate water-containing copper carbonate and hydroxy carbonate of copper.

In the first main stage of the method for producing the inventive polymer, a carbonate of at least one metal a) with the exception of copper and/or the copper-containing material obtained according to the preliminary stage, is fused with at least one oxide of a metal b).

As metal b) for said metal oxide, a metal is thereby used which is a metal from the $1^{st}$ and $2^{nd}$, as well as from the $4^{th}$ through $8^{th}$ subgroup and the $III^{rd}$ through $V^{th}$ main group of the periodic system starting with the atom number 31.

Is copper used as metal a), said oxide of a metal b) may in this case also be a copper oxide or an oxide of another metal b).

When the invention mentions that for the production of the inventive polymer an alkali carbonate and/or an alkaline earth carbonate is/are used, this means in this case that a sole alkali carbonate, a sole alkaline earth carbonate, a compound of several alkali carbonates, a compound of several alkaline earth carbonates or a compound of one or more alkaline earth carbonate(s) or one or more alkaline earth carbonate(s) may be used. And the like applies relative to the metal oxide.

The alkali carbonate and/or alkaline earth carbonate and/or the copper-containing material obtained in the preliminary stage may be fused with an oxide of one, two, three, etc. metals b). The weight ratio between carbonate, respectively of the material from the preliminary stage and the oxide is thereby in the $1^{st}$ stage preferably 25:75 to 60:40. With this range indication, all thereof comprised narrower, or at least integral ranges are characterized and hence disclosed, for example 30:70, 35:65, 38:72, 45:55, 50:50, 53:47 and 58:42.

The melt obtained in the $1^{st}$ main stage, is cooled down slowly in an appropriate manner and then ground, if necessary.

In a $2^{nd}$ main stage the material obtained in the $1^{st}$ main stage is fused with a further oxide of a metal b). Thereby, an oxide having one, two, three or more of the metals b) may be concerned. As metal b), one of the $1^{st}$, $2^{nd}$, $4^{th}$, $5^{th}$, $6^{th}$, $7^{th}$ and $8^{th}$ subgroup, as well as of the $3^{rd}4^{th}$ and $5^{th}$ main group of the periodic system starting with atom number 31 is used. The indication "starting from atom number 31" thereby relates only to the metals of the main groups.

The material obtained in the $1^{st}$ main stage is preferably used in excess in the $2^{nd}$ main stage. The weight ratio between the material obtained in the $1^{st}$ main stage and the oxide is preferably 60:40 to 70:30 in the $2^{nd}$ main stage.

Appropriately, one heats to a temperature in the $1^{st}$ main stage which is lower than the temperature of the $2^{nd}$ main stage. Preferably, the temperature of the $1^{st}$ main stage is 300 to 850° C., and 700 to 1200° C. in the $2^{nd}$ main stage.

The product obtained subsequent to the $2^{nd}$ main stage is designated as intermediate polymer within the framework of the present documents. Said intermediate polymer may be processed into valuable end products such as will be considered below in more detail.

According to a preferred embodiment, the same metal oxide, respectively the same metal oxides is/are used in the $1^{st}$ and $2^{nd}$ main stage.

As metal b) for the metal oxide serve preferably titanium, vanadium, nickel, gallium, germanium, molybdenum, rhodium, indium, antimony, tellurium, tungsten, rhenium, iridium, thallium, bismuth, copper, gold, silver and zinc.

The melt obtained in the $2^{nd}$ main stage may be allowed to cool down, appropriately slowly. The thereby obtained intermediate polymer may then be pulverized, for example ground, and disposes already of electroconductivity.

This intermediate polymer may then be further processed. It is thereby preferably dissolved in a $3^{rd}$ main stage in an aqueous solvent, for example by means of acids or alkaline solutions, and is then electro-deposited under reduction in an electrolytic cell on an in particular conductive substrate, which is poled as a cathode.

A d.-c. power supply such as a battery or a regulated power supply may serve as the energy source for the operation of said electrolytic cell. The voltage thereby is appropriately in a range of about 1 to 25 V. A voltage in a range between 2 and 12 V revealed to be particularly appropriate. The current density usually is in a range between 1 to 100 $mA/cm^2$, further preferred in a range between 1.0 and 35 $mA/cm^2$.

The electrolytic solution should not exceed a temperature of +80° C. In general, a reaction temperature in the range between +40° C. and +70° C. revealed to be very advantageous.

With this coating thus deposited on a substrate, the final electrically conductive inorganic polymer is concerned.

The pulverized intermediate polymer such as described above may again be fused and reduced in the $3^{rd}$ main stage according to a further preferred embodiment. For this fusing, as well as for the fusing processes of the $1^{st}$ and $2^{nd}$ main stage, one appropriately employs a suitable crucible, in which the substances and materials to be fused are placed.

The melt of the intermediate polymer for the remainder may not only be obtained in that—such as described above—the intermediate polymer obtained after the $2^{nd}$ main stage is fused again. One may also immediately use the melt obtained in the $2^{nd}$ main stage without prior cooling down of said melt.

The melt of the intermediate polymer is then preferably reduced electrolytically by means of a real gas or by means of a reducing agent having a reduction potential of −0.100 to −0.900 E°inV. With this reduction, polymer crystals separate out from the melt.

For carrying out the electrolysis of the melt from the intermediate polymer, the latter is fused in a crucible at 650 to 900° C. The electrolysis is carried out with direct current, a current density of 10 to 35 mA/cm$^2$ being preferred. The voltage depends on the melt composition and should be about 0.8 to 3.5 V. As electrodes, those made of graphite or precious metal have proved successful. On these electrodes, more precisely on the cathode, the inventive polymer deposits in the form of crystals. These are then taken out and appropriately washed and dried.

Said reduction may however also be carried out in that just a reducing agent is submerged in the melt. For that purpose, one may for example use an iron rod, on which the crystals from the inventive polymer will then form.

With the described reduction, crystals are obtained having a perovskite-like structure and a tetragonal symmetry. The density of the crystals is in particular 4 to 20 g/cm$^3$.

The inventive polymer is perfectly conductive and disposes of advantageous mechanical properties. It may be used as a conductor in the electrical industry, in medical engineering, galvanotechnics and the automobile industry. The inventive polymer lends itself for being easily further processed and deposited on substrates in the form of a coating. It further exhibits a good resistance against acids and alkaline solutions.

For the remainder, it is assumed that, without being bound to this explanation, the conductivity of the inventive polymer resides in an excess of electrons and that these are freely movable and dispersed over the crystals. The crystals may be regarded as doped metal oxides, the conductivity depending on the content of alkali metal and/or alkaline earth metal and/or copper. Therewith, alkali metals and/or alkaline earth metals and/or copper may be regarded as the dopant. The electroconductivity therewith seems to reside in a mechanism which is different from that of an alloy or an intermetallic compound.

As oxides of the metals b) in the $1^{st}$ and $2^{nd}$ main stage of a method for producing the inventive polymers, all oxides of the used metals may moreover be used.

The object of the present invention is also a method for producing an electrically conductive inorganic polymer or intermediate polymer, and its use as a conductor in the electrical industry, in medical engineering, galvanotechnics and the automobile industry.

General reference may again be made as to that with the ranges indicated within the framework of the present documents, all at least integral values lying between these range limits are characterized and therewith disclosed. This applies independently of the measurement units for the indicated ranges, be it 0° C., V, mA/cm$^2$ or weight ratios. In addition thereto, the range indications comprise as well all smaller/narrower range indications lying therein.

The invention will be explained in detail in the following by means of the examples below describing preferred embodiments. The indicated parts thereby relate to weight parts.

EXAMPLE 1

In a $1^{st}$ main stage, a mixture of six parts of sodium carbonate ($Na_2CO_3$) and four parts of titanium oxide ($Ti_2O_3$) is prepared. This mixture is heated in a crucible under fusing to a temperature of 400° C.

The thus obtained melt is cooled down and ground to a powder.

In a $2^{nd}$ main stage, two parts of the material obtained in the $1^{st}$ main stage are mixed with one part titanium oxide ($Ti_2O_3$). This mixture is heated in a crucible to about 1,000° C.; the thereby obtained melt is kept at this temperature for about 4 hours, and subsequently cooled down at room temperature. The thus obtained intermediate polymer is processed into a powder.

This intermediate polymer may be used for galvanotechnics.

EXAMPLE 2

The same process is carried out as in Example 1, however, sodium carbonate is replaced by potassium carbonate ($K_2CO_3$) and titanium oxide by oxovanadium ($V_2O_5$).

In addition, the melt is not cooled down in the $2^{nd}$ main stage. Instead, a reducing agent, e.g. an iron rod, is introduced under exclusion of air into the melt obtained in the $2^{nd}$ main stage, crystals of said polymer forming then around said iron rod.

The melt is kept in a calm flow for 2 hours to allow crystals to form and grow; subsequently, the melt is allowed to cool down at room temperature.

The crystalline polymer is subsequently washed and dried and is ready for further processing.

EXAMPLE 3

The same process is carried out as in Example 1. However, the melt obtained in the $2^{nd}$ main stage is not cooled down. Instead, graphite electrodes are introduced and an electrolysis is carried out by means of a d.-c. power source.

On the cathode, crystals form from said polymer, these are taken out and subsequently washed and dried.

EXAMPLES 4 THROUGH 6

The same process is carried out as in Example 1. The following initial substances are thereby fused together at the indicated fusing temperature:

| Example | Main Stage | Parts | | Parts | | melt EC |
|---|---|---|---|---|---|---|
| 4 | 1 | 70 | $Ga_2O_3$ | 30 | $Na_2CO_3$ | 420 |
| | 2 | 65.2 | material from main stage 1 | 34,8 | $Ga_2O_3$ | 850 |
| 5 | 1 | 50 | $Mo_2O_3$ | 50 | $Na_2CO_3$ | 470 |
| | 2 | 68 | material from main stage 1 | 32 | $Mo_2O_3$ | 780 |
| 6 | 1 | 50 | $WO_3$ | 25<br>25 | $Li_2CO_3$<br>$Na_2CO_3$ | 410 |
| | 2 | 64 | material from main stage 1 | 36 | $WO_3$ | 815 |

EXAMPLE 7

In a preliminary stage, a mixture of two parts copper carbonate ($CUCO_3$ $(OH)_2$) and one part of molybdenum trioxide ($MoO_3$) is prepared. This mixture is stirred to a thin slurry with distilled water. The temperature of this mixture is kept at about 70°–80° .C for 2–3 hours, and subsequently heated to 130° C., so that the water evaporates. The obtained powder is then ground.

In the 1st main stage, two parts of the material obtained in the preliminary stage are admixed with one part of molybdenium trioxide ($MoO_3$). This mixture is heated to 800° C. in a crucible. The thereby obtained melt is kept at this temperature for about 4 hours and then cooled down at room temperature. The thus obtained product is then further processed into a powder.

In a 2nd main stage, two parts of the material obtained in the 1st main stage are admixed with one part molybdenium trioxide ($MoO_3$). This mixture is heated to 1,000° C. in a crucible; the thereby obtained melt is kept at this temperature for about 4 hours, and is subsequently cooled down at room temperature. The thus obtained intermediate polymer is then processed into a powder.

EXAMPLE 8

The same process is carried out as in Example 7. However, the melt obtained in the 2nd main stage is not cooled down. Instead, graphite electrodes are introduced and an electrolysis is carried out by means of a d.-c. power source.

Crystals from the polymer form on the cathode, these are taken out and subsequently washed and dried.

What is claimed is:

1. An electrically conductive inorganic polymer containing at least one metal a) selected from the group consisting of copper, an alkali metal and an alkaline earth metal, and at least one metal b) selected from the group consisting of a metal of the 1st, 2nd, 4th, 5th, 6th, 7th and 8th subgroup and the 3rd, 4th and 5th main group of the periodic system, starting with atom number 31, obtained by mixing, if metal a) is copper, in a preliminary stage, copper carbonate with an oxide of at least one metal b) to form a slurry with the addition of water and evaporating the water contained in the slurry by heating, by fusing under heat in a melt, in a first main stage, a carbonate of at least one metal a) except copper, or the copper-containing material obtained in the first step, with an oxide of at least one metal b) and allowing the resulting melt to cool down, by fusing under heat, in a second main stage, the material obtained in the first main stage with at least one further oxide of at least one metal b), and by reducing, in a third main stage, the intermediate polymer obtained in the second main stage.

2. The polymer according to claim 1, obtained by using an oxide of the same metal b) in the first and second main stage.

3. The polymer according to claim 1, obtained by the metal b) being selected from the group consisting of titanium, vanadium, nickel, gallium, germanium, molybdenum, rhodium, indium, antimony, tellurium, tungsten, rhenium, iridium, thallium, bismuth, copper, gold, silver and zinc.

4. The polymer according to claim 1, obtained by heating, in the first main stage, to a temperature of less than the temperature of the second main stage, with the temperature of the first main stage ranging from 300 to 850° C. and the temperature of the second main stage ranging from 700 to 1200° C.

5. The polymer according to claim 1, obtained by allowing the melt of the second main stage to cool down and by pulverizing it, if necessary.

6. The polymer according to claim 5, obtained by dissolving the intermediate polymer, in the third main stage, in an aqueous solvent and by electrolytically or galvanically depositing it on a substrate, thus reducing it.

7. The polymer according to claim 5, obtained by re-dissolving the intermediate polymer, in the third main stage by heat and reducing it afterwards.

8. The polymer according to claim 1, obtained by reducing the melt comprising the intermediate polymer electrolytically by means of a real gas or a reducing agent having a reduction potential ranging from −0.100 to −0.900 E°in V.

9. The polymer according to claim 8, wherein the melt is reduced by means of an iron rod and under exclusion of air.

10. The polymer according to claim 1, characterized in that the polymer is in crystalline form having a perovskite-structure.

11. The intermediate polymer obtained according to the processing steps described in claim 1 for the preliminary stage and the first and second main stage.

12. A method for producing an electrically conductive inorganic polymer or intermediate polymer which comprises selecting at least one metal from:

a) a metal selected from the group consisting of copper, an alkali metal and an alkaline earth metal, and at least one metal b) selected from the group consisting of a metal of the 1st, 2nd, 4th, 5th, 6th, 7th and 8th subgroup and the 3rd, 4th and 5th main group of the periodic system, starting with atom number 31, mixing, if metal a) is copper, in a preliminary stage, copper carbonate with an oxide of at least one metal b) to form a slurry with the addition of water and evaporating the water contained in the slurry by heating, fusing under heat in a melt, in a first main stage, a carbonate of at least one metal a) except copper, or the copper-containing material obtained in the first step, with an oxide of at least one metal b) and allowing the resulting melt to cool down, fusing under heat, in a second main stage, the material obtained in the first main stage with at least one further oxide of at least on metal b), and reducing, in a third main stage, the intermediate polymer obtained in the second main stage.

13. An electrically conductive inorganic polymer containing at least one metal a) selected from the group consisting of copper, an alkali metal and an alkaline earth metal, and at least one metal b) selected from the group consisting of a metal of the 1st, 2nd, 4th, 5th, 6th , 7th and 8th subgroup and the 3rd, 4th and 5th main group of the periodic system, starting with atom number 31, obtained by mixing, if metal a) is copper, in a preliminary stage, copper carbonate with an oxide of at least one metal b) to form a slurry with the addition of water and evaporating the water contained in the slurry by heating, by fusing under heat in a melt, in a first main stage, a carbonate of at least one metal a) except copper, or the copper-containing material obtained in the first step, with an oxide of at least one metal b) and allowing the resulting melt to cool down, by fusing under heat, in a second main stage, the material obtained in the first main stage with at least one further oxide of at least one metal b), and by reducing, in a third main stage, the intermediate polymer obtained in the second main stage, wherein the oxide of the same metal is used in the first and second main stage, the metal b) being selected from the group consisting of titanium, vanadium, nickel, gallium, germanium, molybdenum, rhodium, indium, antimony, tellurium, tungsten, rhenium, iridium, thallium, bismuth, copper, gold, silver and zinc and heating, in the first main stage, to a temperature of less than the temperature of the second main stage, with the temperature of the first main stage ranging from 300 to 850° C. and the temperature of the second main stage ranging from 700 to 1200° C.

14. The polymer according to claim 13, obtained by allowing the melt of the second main stage to cool down and by pulverizing it, if necessary.

15. The polymer according to claim 14, obtained by dissolving the intermediate polymer, in the third main stage, in an aqueous solvent and by electrolytically or galvanically depositing it on a substrate, thus reducing it.

16. The polymer according to claim 14, obtained by re-dissolving the intermediate polymer, in the third main stage by heat and reducing it afterwards.

17. The polymer according to claim 13, obtained by reducing the melt comprising the intermediate polymer electrolytically by means of a real gas or a reducing agent having a reduction potential ranging from −0.100 to −0.900 E°in V.

18. The polymer according to claim 17, wherein the melt is reduced by means of an iron rod and under exclusion of air.

19. The polymer according to claim 13, characterized in that the polymer is in crystalline form having a perovskite-structure.

20. The intermediate polymer obtained according to the processing steps described in claim 13 for the preliminary stage and the first and second main stage.

* * * * *